Jan. 24, 1967    J. M. LEACH    3,300,303
COMPOSITE ARTICLE AND METHOD OF MAKING THE SAME
Filed June 16, 1964
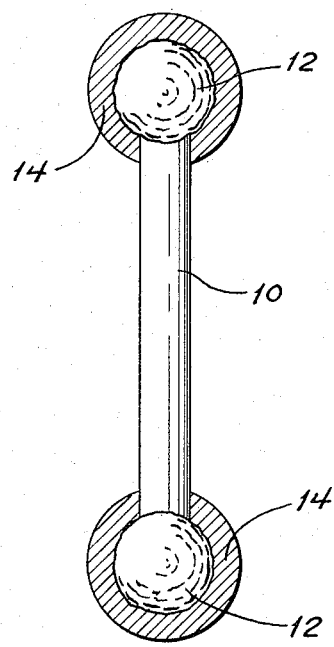
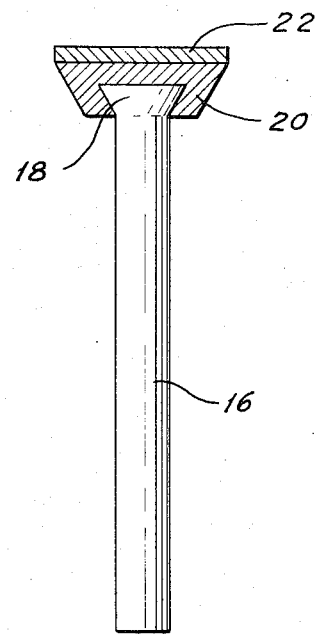
INVENTOR.
John M. Leach United States Patent Office 3,300,303
Patented Jan. 24, 1967

3,300,303
COMPOSITE ARTICLE AND METHOD OF
MAKING THE SAME
John M. Leach, Box 350, Port Jefferson, N.Y. 11777
Filed June 16, 1964, Ser. No. 375,597
2 Claims. (Cl. 75—208)

The present invention relates to composite articles. More particularly, it relates to ferrous, predominantly ferrous and non-ferrous articles in which one or more parts are required to have one degree of surface accuracy and/or a certain physical property and one or more other parts are required to have a different degree of surface accuracy and/or different physical property.

Machine parts and related items are frequently required to have a hard accurate bearing surface over a given area and another area which is not required to be accurately formed but must have some other physical property such as high tensile strength. It has been customary under such a set of requirements to make the dissimilar parts separate and form them and possibly heat treat them individually and thereafter suitably join them as by threaded connections, sleeve connectors, etc. This has greatly increased the cost of production of such items and has frequently resulted in inferior products because of either a weakness at the joinder point or a greatly increased volume at the joinder point to avoid such weakness.

It is an object of the present invention to provide a composite article and method of producing it which article is equally as strong as if made in one piece.

It is another object of the present invention to provide a composite article and method of producing it which article is equally as accurate as if made in one piece.

It is a further object of the present invention to provide a composite article and method of producing it which article is stronger than if made in one piece.

It is a still further object of the present invention to provide a composite article and method of producing it which article is more durable and wear resistant than if made in one piece.

It is a still further object of the present invention to provide a composite article and method of producing it which article costs less to produce than if made in one piece.

It is still another object of the present invention to provide a composite article and method of producing it which article is more durable and wear resistant, stronger, equally as accurate and much less costly to produce than if made in one piece.

Other objects and advantages will become apparent to those skilled in the art by recourse to the following specification and drawing, in which:

FIG. 1 is a partial cross sectional view of an article of the present invention, and FIG. 2 is a partial cross sectional view of a modified form of article of the present invention.

In the case of many machine parts and similar items, such, for example, the tubular conveyor linkages 12 disclosed in copending application Ser. No. 222,330, filed September 10, 1962, and now Patent No. 3,216,553 it is desired that the spherical heads 28 be very hard and accurately formed bearing surfaces whereas the connecting shank or stem need not have commensurate accuracy nor hardness but must have very high tensile strength to provide the working pull on the movable conveyor elements encountered in use.

To form such an element in one piece requires extensive costly machining to form the relatively thin shank portion with the accurately surfaced enlarged heads. To provide a hard bearing surface on the heads and a tough shank with high tensile strength necessitates the use of a very special type of steel for the starting blank and costly and time consuming differential heat treatments with final grinding on the machined piece.

To form such an element in three pieces requires that the two heads be joined in some manner to the shank, for example, by screw threads which greatly reduce the ultimate tensile strength of the linkage, or by brazing which produces linkages of inconsistent strengths unless each one is subjected to a costly proofing test because visual examinations are unavailing.

In accordance with the present invention, this linkage can be rapidly and inexpensively formed to produce an article with very hard, long wearing bearing surfaces on the heads and a very tough high tensile strength shank by starting with a blank having a desired shank diameter as shown at 10 and formed of a steel which greatly increases in strength at a given heating temperature. Very crudely formed heads 12 are formed on each end by any desired and well known heading or upsetting operations without regard to the surface accuracy of these heads. In fact, the rougher they are the better although it is preferred that each head be of close to the same volumetric metal capacity.

Shells or casings 14 are then formed around the heads 12 by well known powder metallurgy procedures, such for example, as disclosed in the publication entitled "Tooling for Metal Powder Parts" by George H. De Groat, published by McGraw-Hill Book Company, Inc., 1958. This will entail selecting a metal powder which at the heat treating temperature selected for the shank will produce a very hard and long wearing bearing surface. Such metal powders are well known items of commerce.

Each head will be formed separately and an upper and lower movable section die will be used so as to finally form a substantially uniform spherical surface as long as a definite preselected quantity of metal powder is supplied to both the upper and lower sections of the die. When the quantities of metal powder are supplied with reasonable accuracy, no subsequent coining or grinding operations upon the spherical heads will be required because of the volumetric consistency of the heads 12 as above explained.

The heads 14 may be sintered simultaneously with the die forming operation or subsequently as desired.

After sintering the linkages will be heat treated in known manner preferably in an inert atmosphere so as to avoid any oxidation of the precision surfaces of the shells 14. When the steels for the shank 12 and shells 14 have been selected as explained above, for example, a 4130 aircraft type steel for the shank and a 52100 bearing steel for the shells, subjection of the entire linkage to a given temperature, for example, 1735 degrees F. in a nitrogen atmosphere for 25 minutes, will produce a linkage having a tough, non-brittle shank with an ultimate tensile strength in excess of 160,000 p.s.i., and a head on each end having a hardness of approximately 58 Rockwell "C" and with a smooth and uniform bearing surface. This will have been accomplished without any machining operations or loss of metal.

The composite articles of the present invention may take many other forms, for example an internal combustion engine poppet valve as shown in FIG. 2. In such an article the shank 16 will be selected from a metal which will be tough and have a high tensile strength after heat treating. The shank 16 will be suitably upset or headed to form the enlarged end 18. A shell 20 formed of a metal which will provide a hard bearing surface after being heat treated at the same time as the shank 16 is again formed by powdered metal metallurgical techniques as explained above. Here a third type of metal can be introduced into the composite article at the time of formation, for example, a disc 22 formed of a metal which is highly temperature resistant after being heat treated at the same time as the shank 16 and the shell 20 is placed in the die prior to the introduction of the powdered metal and permanently attached to the shell 20 by the pressing and sintering operations.

Following the sintering operation the valve will be heat treated as explained above to form a composite valve having a tough, high tensile strength shank or stem 16, a hard and long wearing head 20 provided with a highly heat resistant top section 20. All of this will again have been brought about without any expensive machining operations or loss of metal.

It is to be understood of course that light grinding or polishing operations will be employed where desired to provide an attractive finish or a very smooth bearing surface.

In the formation of composite articles as explained herein it is preferred that the inner head such as 12 and 18, be shaped as closely as possible so as conform to the final shape of the finished article at this point. This is so that the shells 14 and 20 have as nearly uniform wall thickness as possible which unifies contraction of the shells during cooling and eliminates any tendency to crack because of non-uniform wall thickness.

The foregoing description is to be considered as illustrative and not limitative since many changes and modifications can be made in the composite article and method of producing it without departing from the spirit of the invention.

The invention having been described, what is claimed is:

1. The method of producing a mechanical load carrying, stress resistant, composite article which in its finished state will have at least one surface area which conforms accurately in both shape and dimensions to predetermined specifications and which surface area would normally be produced by machining, comprising selecting a metallic starting blank of desired size and configuration, roughly working at least a part of the blank into a preliminary shape which is not dimensionally accurate but generally relates to the final desired specified shape and dimensions and is sufficiently large to predominantly occupy the volume of the final desired shape and provide a strong reinforcing base for the same but is smaller by a definite volumetric amount throughout than the final desired shape, placing the roughly formed reinforcing base into a die which has an interior shape and dimensions which accurately conform to the final desired shape and dimensions of the said area on the final composite article, filling into said die and around said roughly formed reinforcing base an accurately predetermined quantity of powdered metal which when compressed will form a shell over the roughly formed reinforcing base, said shell having a thickness which is sufficient to coat said roughened surface and leave a thin, smooth outer coating on said base which will have the accurate outer shape and dimensions specified, compressing said powdered metal to form such shell over the predominating, rough but strong reinforcing base, and sintering to thus produce an accurately formed final shape without machining which is capable of carrying a substantial mechanical load without failure or excessive wear.

2. The method specified in claim 1 further characterized in that the said shell is formed with a nearly uniform thickness throughout.

References Cited by the Examiner
UNITED STATES PATENTS

| | | | |
|---|---|---|---|
| 1,671,953 | 5/1928 | Gibson | 29—182.3 X |
| 1,703,177 | 2/1929 | Short | 75—208 X |
| 2,892,707 | 6/1959 | Biggs | 75—208 |
| 2,978,353 | 4/1961 | Meier | 75—208 X |
| 3,214,651 | 10/1965 | Van Dyck et al. | 29—182.2 X |

CARL D. QUARFORTH, *Primary Examiner.*

BENJAMIN R. PADGETT, *Examiner.*

M. J. SCOLNICK, *Assistant Examiner.*